US009032320B2

(12) United States Patent
Crawford et al.

(10) Patent No.: US 9,032,320 B2
(45) Date of Patent: May 12, 2015

(54) TIME AND LOCATION BASED GUI FOR ACCESSING MEDIA

(75) Inventors: David W. Crawford, Long Beach, CA (US); Roger S. Holzberg, Burbank, CA (US); Jeffrey Voris, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 660 days.

(21) Appl. No.: 12/206,636

(22) Filed: Sep. 8, 2008

(65) Prior Publication Data

US 2010/0064239 A1 Mar. 11, 2010

(51) Int. Cl.
*G06F 17/30* (2006.01)

(52) U.S. Cl.
CPC .... *G06F 17/30265* (2013.01); *G06F 17/30058* (2013.01); *G06F 17/30061* (2013.01); *G06F 17/30064* (2013.01)

(58) Field of Classification Search
CPC ... G06F 3/0484; G06F 3/04847; G06F 17/30; Y10S 707/913; Y10S 707/918
USPC ............ 715/771, 704, 730–32, 833–35; 707/723–25, 913–16, 918–20
See application file for complete search history.

(56) References Cited

U.S. PATENT DOCUMENTS

| | | | |
|---|---|---|---|
| 6,545,660 B1 * | 4/2003 | Shen et al. ............... | 345/156 |
| 6,741,864 B2 * | 5/2004 | Wilcock et al. ........... | 455/456.1 |
| 6,883,146 B2 * | 4/2005 | Prabhu et al. ............. | 715/854 |
| 6,906,643 B2 * | 6/2005 | Samadani et al. ........ | 340/995.18 |
| 7,475,060 B2 * | 1/2009 | Toyama et al. ........... | 1/1 |
| 7,734,622 B1 * | 6/2010 | Fitzhugh .................. | 707/913 |
| 8,219,932 B2 * | 7/2012 | Rhee et al. ............... | 715/838 |
| 8,577,874 B2 * | 11/2013 | Svendsen et al. ........ | 707/913 |
| 8,584,015 B2 * | 11/2013 | Osten ....................... | 715/731 |
| 2002/0097894 A1 * | 7/2002 | Staas et al. ............... | 382/113 |
| 2002/0140820 A1 * | 10/2002 | Borden, IV ............... | 348/207.99 |
| 2003/0033296 A1 * | 2/2003 | Rothmuller et al. ...... | 707/3 |
| 2004/0172419 A1 | 9/2004 | Morris et al. | |
| 2004/0230371 A1 * | 11/2004 | Vincent et al. ........... | 701/200 |
| 2006/0090141 A1 | 4/2006 | Loui et al. | |
| 2006/0181546 A1 | 8/2006 | Jung et al. | |
| 2007/0120871 A1 * | 5/2007 | Okamoto et al. ......... | 345/619 |
| 2008/0098316 A1 * | 4/2008 | Declan ..................... | 715/764 |
| 2008/0148176 A1 | 6/2008 | Mlta | |
| 2009/0204899 A1 * | 8/2009 | Bennett .................... | 715/730 |

FOREIGN PATENT DOCUMENTS

| | | | |
|---|---|---|---|
| JP | 2002297654 A | * | 10/2002 |
| JP | 2003-098958 | | 4/2003 |
| JP | 2007-322847 | | 12/2007 |

OTHER PUBLICATIONS

Jim Gemmell et al., "Telling Stories With MyLifeBits," Jul. 6, 2005, Multimedia and Expo, 2005. ICME 2005, pp. 1536-1539 (referenced as pp. 1-4 in the office action, respectively).*
A European Search Report completed Nov. 4, 2009 for corresponding EP Patent Application No. EP 09169762.3.

* cited by examiner

*Primary Examiner* — Dino Kujundzic
(74) *Attorney, Agent, or Firm* — Farjami & Farjami LLP

(57) ABSTRACT

A system and method for accessing digital media based on the time and location the media was captured. The digital media is associated with time and location information. The media is presented along with a geographical representation of where the media was captured and an indication of time when the media was captured.

14 Claims, 15 Drawing Sheets

TIME AND LOCATION BASED GUI FOR ACCESSING MEDIA

BACKGROUND OF THE INVENTION

1. Field of the Invention

This application generally relates to applications for accessing digital media.

2. Description of the Related Technology

The proliferation of electronic devices within our society has greatly increased in the past years. Where electronic devices such were previously uncommon, now, a large percentage of society has access to or owns at least one electronic device. In addition, many different types of computing devices have been created. Personal digital assistants (PDAs), smartphones, portable media players, and laptops have all become mainstream items.

One of the most common electronic devices is the digital camera. Traditionally, people have used film or tapes to record their pictures or videos. With the advances in electronics, high quality images and video can now be captured without the use of film or tape. Instead of carrying multiple rolls of film or carrying multiple cassette tapes, users can now store their images and video on memory cards or hard drives. This greatly reduces the amount of physical space needed to store images and video. Previously, one would have many photo albums and collections of cassette tapes to archive and store their images and video which would make accessing and sharing media difficult. With the advent of digital cameras, images and videos can be stored on memory cards or hard drives which allow users to easily store and share media in a much more compact space. However, as the amount of media a user captures grows, it becomes harder and harder to manage and access the media. The media produced by digital cameras and digital video recorders is generally given a non-descriptive name and a time stamp. With this information, it is generally difficult for a user to access specific media that they wish to view. A user generally needs to take on the arduous task of manually sorting the media in order to access specific media more easily. A simpler and more natural system and method for accessing, viewing and sharing media is needed.

SUMMARY OF THE INVENTION

In one embodiment, the invention comprises a method of presenting media, comprising selecting via an electronic interface, at least one of a specific time and a range of times, displaying a location in a geographical area wherein the location displayed is based, at least in part, on the selected time or the range of times, and presenting media wherein the media displayed is based, at least in part, on the selected time or the range of times.

In another embodiment, the invention comprises a system for presenting media, comprising a first graphical user interface component configured to indicate at least one of a specific time and a range of times, a second graphical user interface component configured to indicate a location in a geographical area and wherein the location indicated is based, at least in part, on the specific time or the range of times indicated by the first graphical user interface component, and a third graphical user interface component configured to display media wherein the media displayed is based, at least in part, on the specific time or the range of times indicated by the first graphical user interface component.

In another embodiment, the invention comprises a system for presenting media, comprising, a display unit configured to present at least one of images, video and sound, a user input module configured to accept a user input wherein the user input indicates a selection of at least one of a specific time and a range of times, and a processor configured to process the user input display a location in a geographical area wherein the location displayed is based, at least in part, the specific time or the range of times and present media on the display unit wherein the media presented is based, at least in part, on the specific time or the range of times.

In another embodiment, the invention comprises a system for presenting media, comprising means for selecting at least one of a specific time and a range of times, means for displaying a location in a geographical area wherein the location displayed is based, at least in part, on the specific time or range of times, and means for presenting media wherein the media displayed is based, at least in part, on the specific time or range of times.

DETAILED DESCRIPTION OF CERTAIN EMBODIMENTS

Figure 1A:
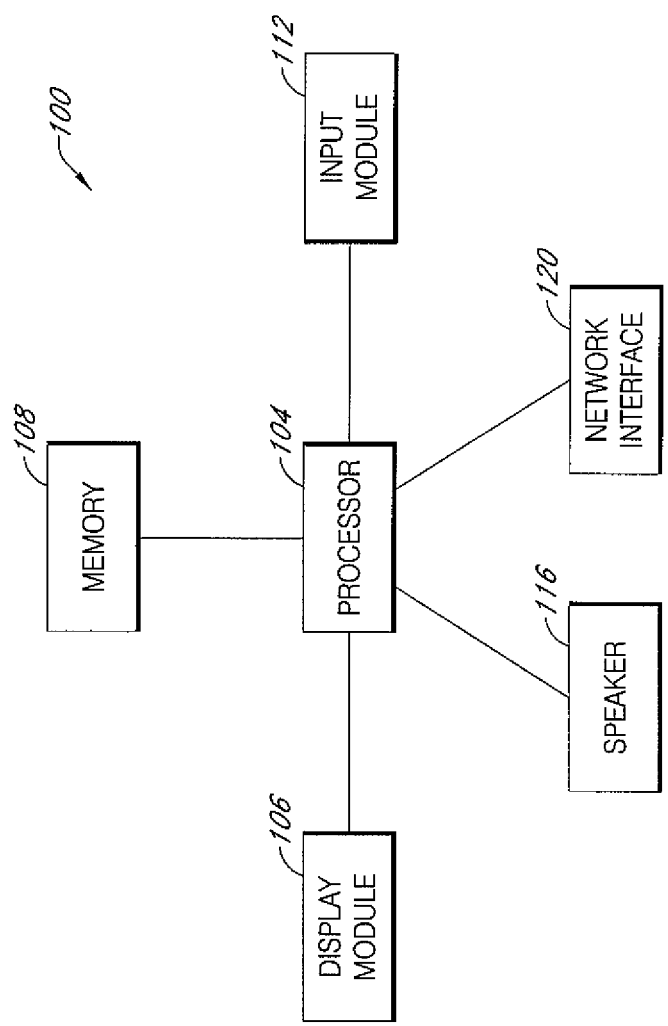
FIG. 1A is a block diagram of a computing device.

With the integration of digital cameras and location aware systems, users can now correlate a location along with a time the media was captured. This added capability allows uses to sort their media by location and also by time. However, it is still hard to sort, manage and access media, even if it is sorted by location. Regardless of whether or not media is sorted by time or by location, it is hard to access and present the media in a natural manner similar to the way a person would tell a story of their vacation. Users need a more natural and a more simple system and method for presenting and accessing media which allows a user to access and share his media in a natural, story-based fashion which correlates the media that was captured, with a particular time and place that the media was captured.

The following detailed description presents various descriptions of specific embodiments. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments may include several novel features, no single one of which is solely responsible for its desirable attributes or which is essential to practicing the inventions herein described.

The system comprises various software modules, components, hardware such as general purposes processors, ASICs, FPGAs, and applications as discussed in detail below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The software modules, components, hardware and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code. In addition, the system may comprise software, hardware or a combination of both hardware and software.

FIG. 1A is a block diagram of a computing device 100. The computing device 100 may comprise a processor 104, a memory 108, an input module 112, a display module 106 and speakers 116. The processor 104 which may comprise any general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), or any special purpose microprocessor such as a digital signal processor, microcontroller, or a programmable gate array. Memory 108 may comprise a hard disk, RAM, ROM, a memory card, CD-ROM, DVD-ROM, or some other means for storing data. Input module 112 may comprise a keyboard, mouse, touch pad, touch screen, lever, knob, dial, slider, or some other mean for providing user input. Display module 106 may comprise an LCD monitor, a CRT monitor, a plasma monitor, a touch screen or some other means for displaying media. Speakers 116 may comprise speakers, headphones, or some other means for playing audio output. Network interface 120 may comprise a wired network card, a wireless network card, or some other means for communicating with a network. Network interface 120 may be connected to a local area network (LAN), or a wide area network (e.g. internet) or some other form of network. Network interface 120 may receive signals according to wired technologies including but not limited to Ethernet, telephone (e.g., POTS), and fiber optic systems, and/or wireless technologies including but not limited a code division multiple access (CDMA or CDMA2000) communication system, a GSM/GPRS (General Packet Radio Service)/EDGE (enhanced data GSM environment) or an IEEE 802.11b system.

Figure 1B:
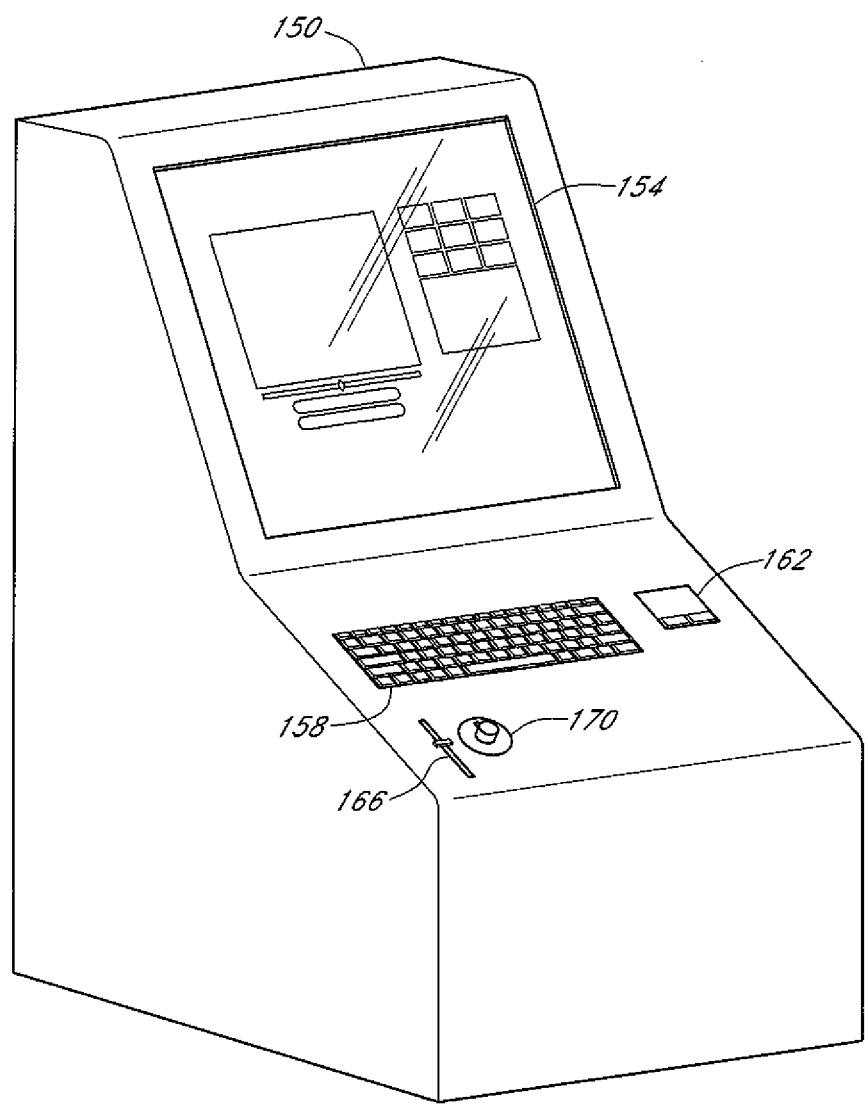
FIGS. 1B-1E are diagrams illustrating examples of systems which may be used to access and view media.

FIG. 1B is a diagram illustrating an example of a system 150 which may be used to access and view digital media that has previously been stored. The digital media may be stored within the memory of system 150 itself. It may also be stored on at least one server and accessed via a wired connection including but not limited to serial cables, Ethernet cables or USSB cables, or a wireless connection including but not limited to WiFi connections such as IEEE 802.11b, cellular connections such as a code division multiple access (CDMA or CDMA2000) or a GSM/GPRS (General Packet Radio Service)/EDGE (enhanced data GSM environment), a Bluetooth connection or an infrared connection. The system 150 has a display 154. Display 154 may be a CRT monitor, an LCD monitor or a touch screen. Display 154 is used to view and present media. System 150 also comprises a keyboard 158, a mouse pad 162 a lever 166 and a knob 170. Keyboard 158, a mouse pad 162 a lever 166 and a knob 170 may be used to provide user input.

Figure 1E:
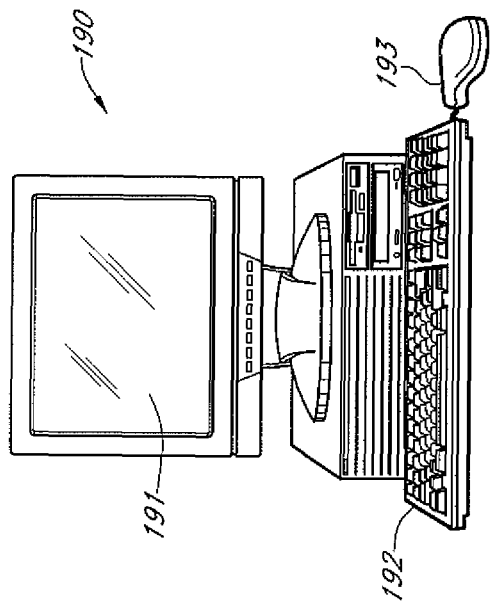
Figure 1D:
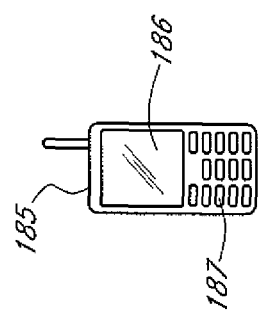
Figure 1C:
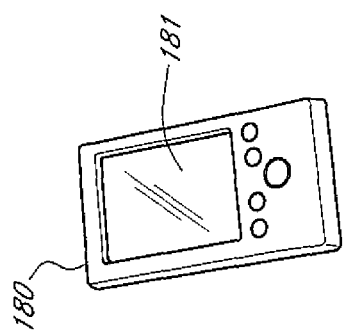

FIG. 1C is a diagram illustrating another example of a system 180 which may be used to access and view digital media that has previously been stored. System 180 may comprise a PDA. The digital media may be stored within the memory of system 180 itself. It may also be stored on at least one server and accessed via a wired connection including but not limited to serial cables, Ethernet cables or USB cables, or a wireless connection including but not limited to WiFi connections such as IEEE 802.11b, cellular connections such as a code division multiple access (CDMA or CDMA2000) or a GSM/GPRS (General Packet Radio Service)/EDGE (enhanced data GSM environment), a Bluetooth connection or an infrared connection. The system 180 has a touch screen display 181. Touch screen display 181 may be used to view and present media. Touch screen display 181 may also be used to provide user input via a stylus or other instrument for providing input to a touch screen. System 180 may also comprise other types of hand-held devices which are capable of displaying media and accepting user input, such as media player devices, cellular phones, and other electronic devices.

FIG. ID is a diagram illustrating an example of a system 185 which may be used to access and view digital media that has previously been stored. System 185 may comprise a smartphone. The digital media may be stored within the memory of system 185 itself. It may also be stored on at least one server and accessed via a wired connection including but not limited to serial cables, Ethernet cables or USB cables, or a wireless connection including but not limited to WiFi connections such as IEEE 802.11b, cellular connections such as a code division multiple access (CDMA or CDMA2000) or a GSM/GPRS (General Packet Radio Service)/EDGE (enhanced data GSM environment), a Bluetooth connection or an infrared connection. The system 185 has a display 186. Display 186 may be a an LCD display or a touch screen display. Display 186 may be used to view and present media. System 185 also comprises a keyboard 187, which may be used to provide user input.

FIG. 1E is a diagram illustrating an example of a system 190 which may be used to access and view digital media that has previously been stored. System 190 may comprise a personal computing device such as a personal computer. The digital media may be stored within the memory of system 190 itself. It may also be stored on at least one server and accessed via a wired connection including but not limited to serial cables, Ethernet cables or USB cables, or a wireless connection including but not limited to WiFi connections such as IEEE 802.11b, cellular connections such as a code division multiple access (CDMA or CDMA2000) or a GSM/GPRS (General Packet Radio Service)/EDGE (enhanced data GSM environment), a Bluetooth connection or an infrared connection. The system 190 has a display 191. Display 191 may be a CRT monitor, an LCD monitor or a touch screen. Display 191 is used to view and present media. System 190 also comprises a keyboard 192, a mouse 193, which may be used to provide user input.

Figure 2C:
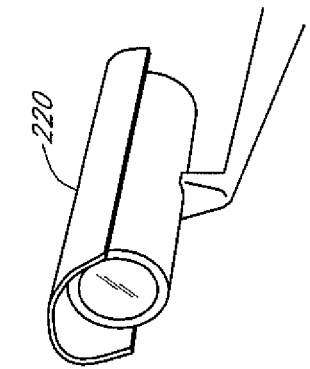
FIGS. 2A-2C illustrate examples of devices that may capture media.
Figure 2B:
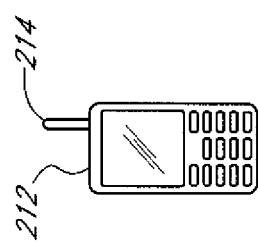
Figure 2A:
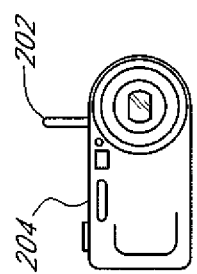

FIGS. 2A-2C illustrate examples of devices that may capture media. These media capture devices may capture at least one of images, videos and sound recordings. FIG. 2A is a diagram of a digital camera 204. Digital camera 204 may be able to capture images, video and sound. In one embodiment, digital camera 204 has an antenna 202 for an integrated GPS system. Other types of location aware system other then GPS may be used by digital camera 204. The location aware system may be integrated with the digital camera 204 or it may be a separate unit that may be connected to digital camera 204 via a wired or a wireless connection. FIG. 2B is a cellular phone 212 with media capture capability. In one embodiment, cellular phone 212 has an integrated camera which may capture both images and videos. In another embodiment, cellular phone 212 also has an antenna 214 for an integrated GPS system.

FIG. 2C illustrates a mounted camera 220. Because mounted camera 220 is stationery, it does not need a location aware system to determine its location as its position is fixed. However, mounted camera 220 may include an integrated location aware system such as a GPS system. Mounted camera 220 may be used within theme parks and may be positioned around popular attractions within the theme park. When mounted cameras 220 are used, a user may associate himself with the captured media in a variety of ways. For example, when the user rides an attraction in a theme park, a mounted camera 220 may take a picture of the user at some point within the ride. The user may use a system as shown in FIG. 1B to access all of the media the camera has taken and select the media that is pertinent to him. The user may associate media with himself in a variety of ways. The user may have a radio-frequency identification (RFID) card which identifies the user. Or the user may have a user name and a password for an account that identifies the user. The user may then use the system shown in FIG. 1B to access all of the media associated with him.

Figure 2D:
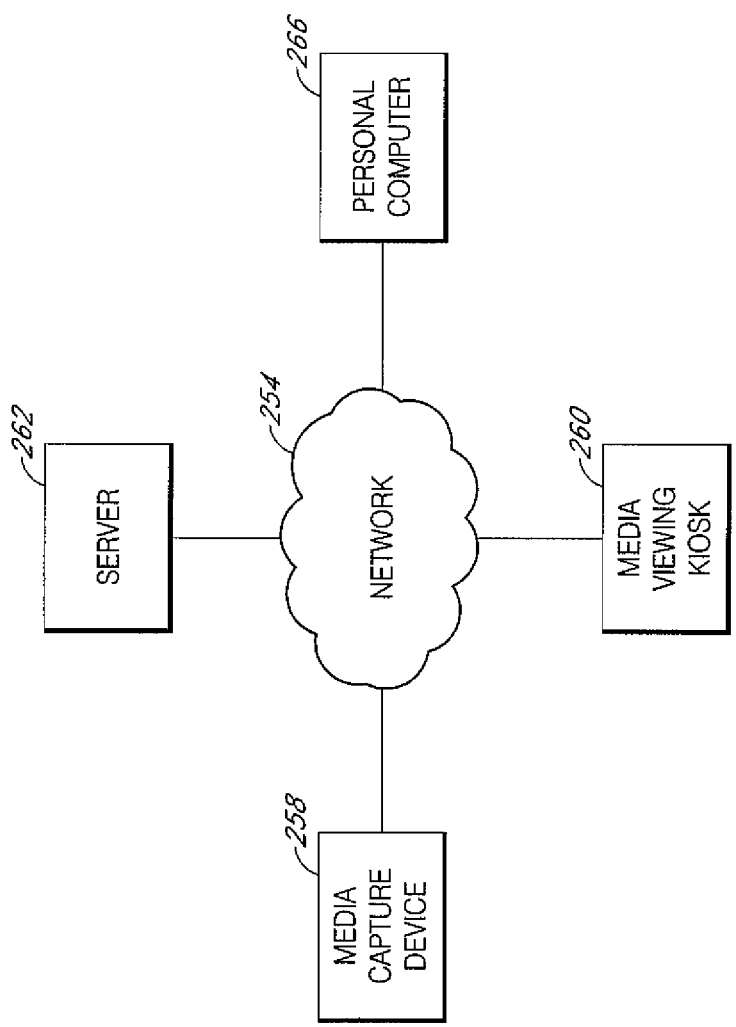
FIG. 2D is a block diagram of a system that may be used by various embodiments.

FIG. 2D is a block diagram of a system that may be used by various embodiments. As shown in FIGS. 2A-2C, a variety of devices may capture media such as images, video or sound recordings. Media capture device 258 may transmit captured the media through network 254 to server 262. The captured media is stored on server 262 for access and viewing at a later time. Personal computer 266 may use various embodiments to access the media stored on server 262. A media viewing kiosk 260 (as correspondingly shown by system 150 in FIG. 1B) may also be used to access the media stored on server 262. Please note that a variety of system configurations may use the methods and system described herein. For example, the media capture device 258 could be directly connected to personal computer 266 and the media may be stored directly on personal computer 266 instead of a server 262. The personal computer 266 may use the methods described herein to access the media. This application in no way limits the types of systems that can be used to access and manage media according to the methods and systems described herein.

FIGS. 3A-3D illustrates a sequence of graphical user interfaces according to a first embodiment. FIGS. 3A-3D represent the graphical user interface a user may use to access and present their media to other users. For example, a user may take a trip around the world during a certain period of time. The user has captured a variety of images, videos and sound recordings during the trip using a location aware media capture device. The location aware media capture device captures media, and associates time and location data with the captured media. The media may be stored on a server and remotely accessed using a system such as the one shown in FIG. 1B, or on the user's personal computer or other device.

In the embodiment shown in FIGS. 3A-3D, a user is presenting media he captured during a trip around the world. The portion of the timeline for the trip illustrated in FIGS. 3A-3D starts in Seattle, Wash. at FIG. 3A and moves to Disneyland in Anaheim, Calif. in FIG. 3D. The user may want to access or share the media captured during the trip with friends and family. Using a geographical location along with a selected time or a range of times, a user is able to share and view their media in a linear, story based format. For example, a user can begin the story of his trip by starting his origination point, for example, at the airport. The media that was captured while he was at the airport may be displayed if the user selects the time or range of times in which he was at the airport. As the user moves in time during his trip, he moves from location to location and his geographical location changes. Correspondingly, FIGS. 3A-3D show the timeline of the user's trip and the geographical location is updated and the media presented is updated corresponding to the user's progress through the length of this trip.

Figure 3A:
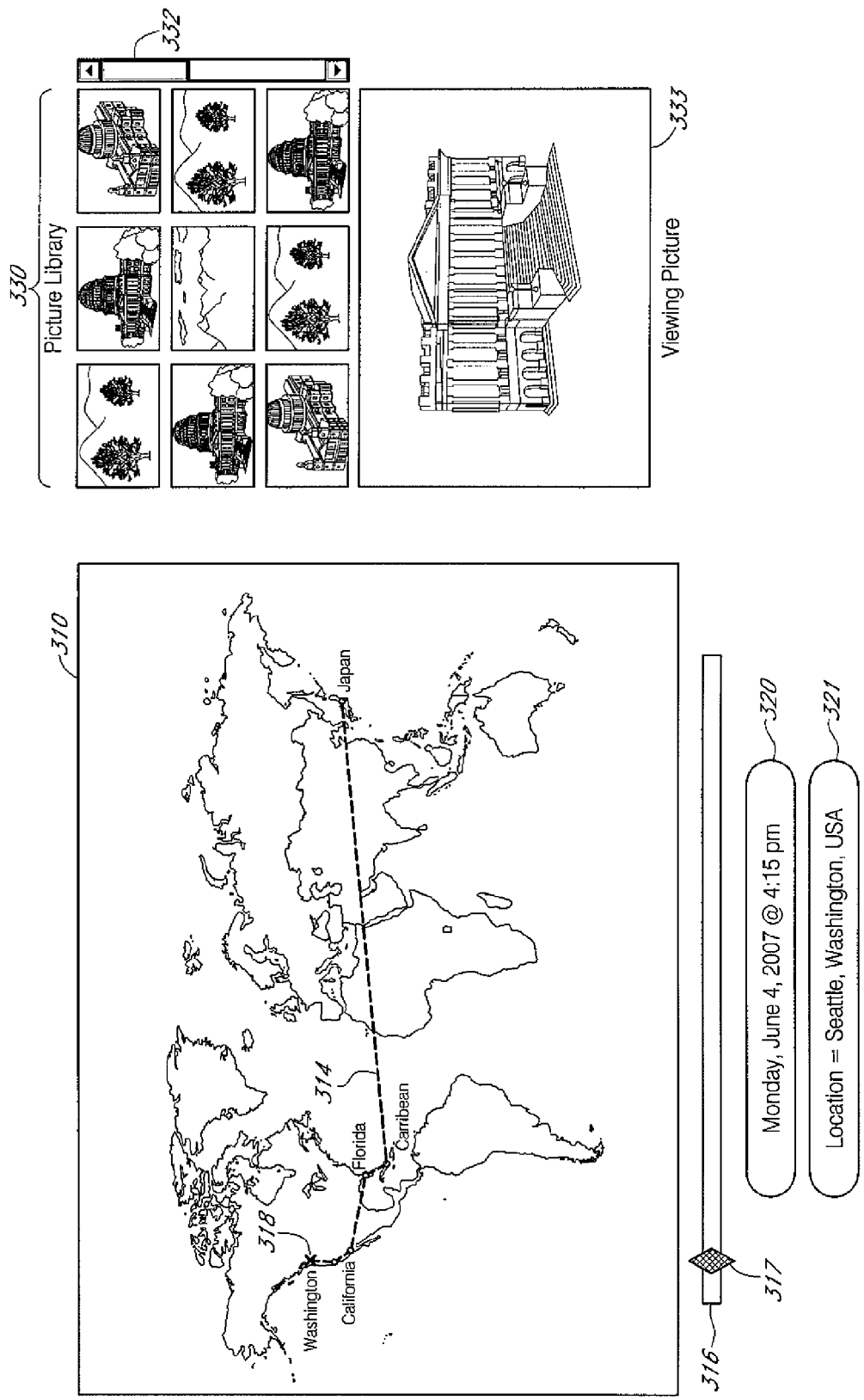
FIGS. 3A-3D illustrates a sequence of graphical user interfaces according to a first embodiment.

FIG. 3A is a representation of a graphical user interface according to one embodiment. The map 310 shows a trail 314 of the user's trip around the world. In one embodiment, sliding bar 316 represents the total length of time for the user's trip. Slider 317 represents the current time selected by the user. Location indicator 318 indicates the location where the media was captured corresponding to the time indicated by slider 317 and the sliding bar 316. The selected time is displayed in time information bar 320. The time that is displayed in information bar 320 may be in a variety of formats. For example, the month, day and year may be displayed after a clock time or only the date may be displayed. The location of the media that was captured during the selected time is displayed in location information bar 321. The location that is displayed in the location information bar 320 may be in a variety of formats. For example, the country, state and city may be displayed or only the country and city may be displayed. In another embodiment, points of interest may also be displayed on map 310. These points of interests may comprise locations during the timeline of a trip where media has been captured. These points of interest may comprise locations specified by a user. By setting points of interest, a user may select a point of interest and view media associated with the point of interest.

In one embodiment, the captured media is associated with time and location data. The time data may comprise the time which the media was captured. The location data may comprise a location where the media was captured. Examples, of time data include but are not limited to month, date, year and time of day. Examples of location data include but are not limited to GPS coordinates, longitude and latitude, street names and ZIP codes. In some embodiments, the location data may be used to display the trail 314 on the map 310. For example, media may be associated with a particular city such as San Francisco. The trail 314 would go through San Francisco on the map as there was media captured in that location. In other embodiments, the time data may be used to correspond the sliding bar 316 with the times associated with the media. For example, the time data of the captured media may be analyzed to determine the earliest time of the media which corresponds with the start of sliding bar 316 and the latest time of the media which corresponding with the end sliding bar 316.

In one embodiment, a preview or thumbnails of the media that was captured during the selected time is displayed in preview window 330. The number of previews or thumbnails displayed in preview window 330 may be modified by the user. For example, a user may want to see sixteen preview images instead of the nine shown in FIG. 3A. A window slider 332 allows the user to scroll through previews or thumbnails of all the media that was captured during the selected time. In one embodiment, only the media corresponding to the elected time may be displayed in preview window 330. For example, if a user has twenty images for a trip, but only eight images associated with a selected time, then preview window 330 may only display the 8 images associated with the selected time. In another embodiment, the user may be able to preview all the media for a trip in preview window 330, but preview window 330 may be scrolled down to media associated with the selected time. For example, if a user has thirty images for a trip, but only ten images correspond with the selected time, then preview window 330 may be scrolled down to the ten images. However, a user may scroll through all thirty images in the preview window using window slider 332. If a user selects a particular media shown in the preview window 330, the media is displayed in the media viewing window 333. In other embodiments, a separate media viewing application may be executed when a user selects a particular media from preview window 330. For example, if the user selects an image in preview window 330, an application such as "Microsoft Picture and Fax Viewer" may be executed to display the media.

In the embodiment shown in FIG. 3A, a user has moved slider 317 to the starting point of his trip. The time displayed in the location bar 320 is Jun. 4, 2007 at 4:15 PM. The media captured by the user during the selected time was captured in Seattle, Wash., USA. A preview of all the media captured during the selected time is displayed in preview window 330. If the user does not select a particular media, the first media captured during the selected time may be displayed in the media viewing window 333. If the user selects a particular media for viewing, the selected media will be displayed in the media viewing window 333.

As shown in FIGS. 3A-3D, the same media is displayed in the preview window 330 and the viewing window 333 for all selected times or range of times. The same media is displayed as an example to illustrate the concept of a preview window 330 and the viewing window 333. When a user uses the method or system according to certain embodiments as described herein, the media displayed in preview window 330 and viewing window 333 may change as the user selects different times, ranges of times, locations, or points of interest on the map.

In other embodiments, a point of interest or a particular point may be selected in the trail 314. By selecting a point of interest or a particular point in the trail 314, the slider 317, time information bar 320 and location information bar 321 may be updated to reflect the time and location of the selected point of interest or point in the trail. In one embodiment, a user may use an input device such as a mouse, keyboard or a touch screen to select a point of interest on the map. The map may zoom in from a larger view to show a close up map of the point of interest. The slider 317 may be moved along sliding bar 316 to indicate the corresponding time or range of times for the media associated with the selected point of interest. The preview window 330 may also be updated with the previews or thumbnails for the selected point of interest or point in the trail. The location indicator 318 is moved to the selected point of interest selected on the map.

In alternative embodiments, the map 310 may not display the location indicator 318 on the trail 314. The trail 314 on the map may be updated as the slider 317 moves through the sliding bar 316 instead of using location indicator 318 to indicate the location corresponding to the position of slider 317. For example, in FIG. 3A, as the slider 317 moves from left to right on slider bar 316, the trail 314 first appears at the starting point in Washington. The trail 314 would then lead to California, then to Florida, then to the Caribbean, and then to Japan as the user moves slider 317 from left to right. In another embodiment, the trail 314 may be displayed on map 310 up until a selected point of interest.

Figure 3B:
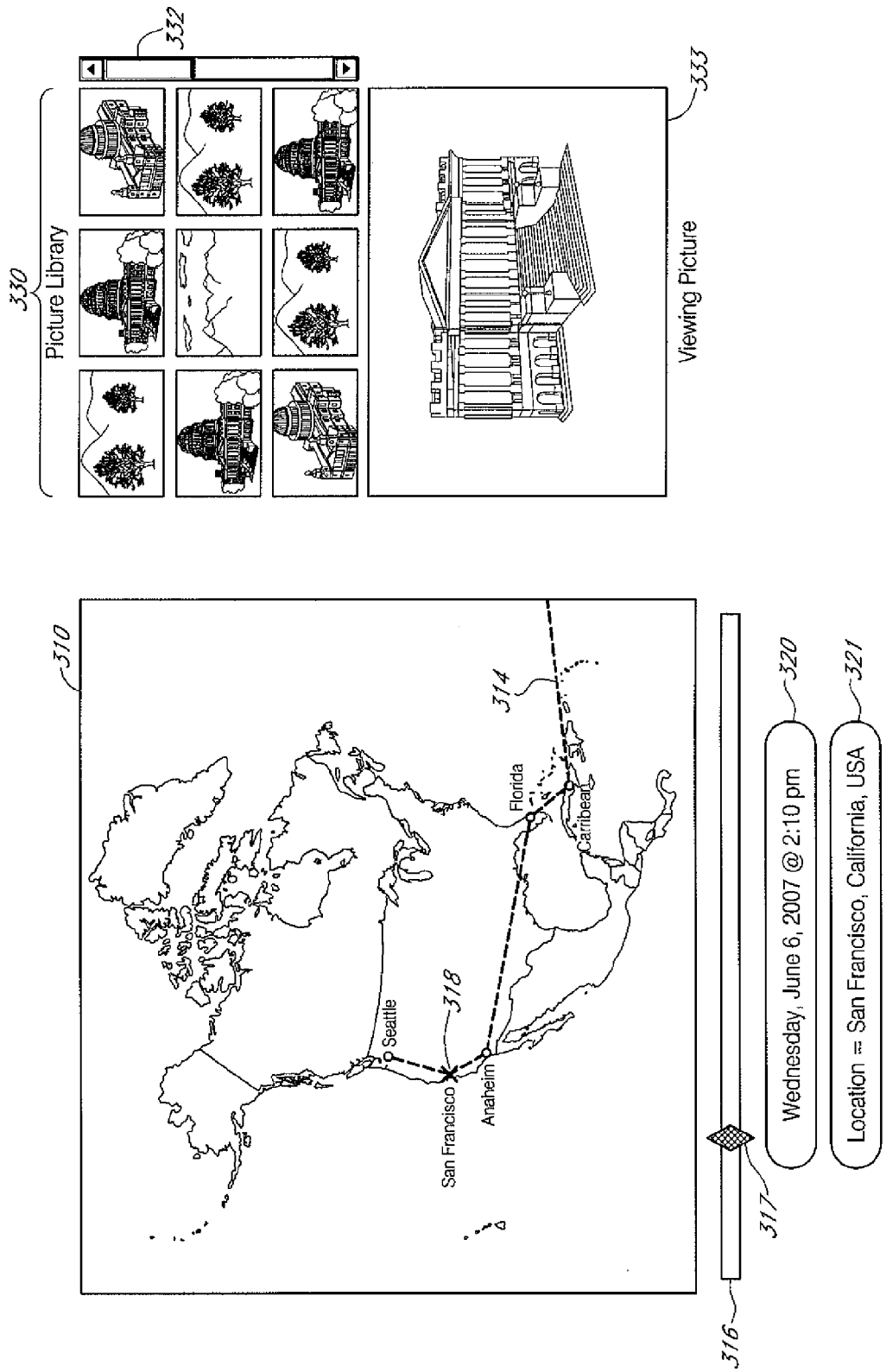

In FIG. 3B, the slider 317 has been moved farther to the left along sliding bar 316 then in FIG. 3A. This corresponds to a transition in time along the timeline of the trip. In FIG. 3A, the user was in Seattle, Wash. on Jun. 4, 2007. In FIG. 3B, the time is now Jun. 6, 2007 at 2:10 PM and the user has transitioned to San Francisco, Calif. Media preview window 330 has been updated to present media that was captured in San Francisco. The map 310 has zoomed in from the world view to a view of the North American continent. Location indicator 318 has been moved to San Francisco on trail 314. A default or user selected image is displayed in media viewing window 333. In alternative embodiments, the map may not zoom in or out as the slider 317 is moved along sliding bar 316. The map 310 may display the same view and simply update the location indicator 318 or the trail 314 as the slider 317 is moved.

In one embodiment, the map 310 may be set to automatically zoom as the user moves the slider 317 or selects locations or points of interests on the map 310. For example, in FIG. 3B, if a user selects the point of interest "San Francisco", the map may zoom into a close up view of San Francisco (e.g. a map of San Francisco). In another example, as the user moves slider 317 along sliding bar 316, the map may zoom in automatically when a location indicator 318 has reached a selected point or point of interest. For example, the location indicator 318 may be positioned between Seattle and San Francisco for a selected time. As the user moves the slider 317, the location indicator 318 may move to San Francisco. The map 310 may then zoom in to a close up map of San Francisco. As the user moves the slider 317 further, the location indicator 318 may move past San Francisco on the trail 314 and the map 310 may zoom out to a view of the North American continent.

In another embodiment, the user may manually zoom the map closer or farther away. For example, the user may select San Francisco on the map 310 and may manually zoom into a map of San Francisco. Or the user may zoom out from a street level view to a state level view of the map.

Figure 3C:
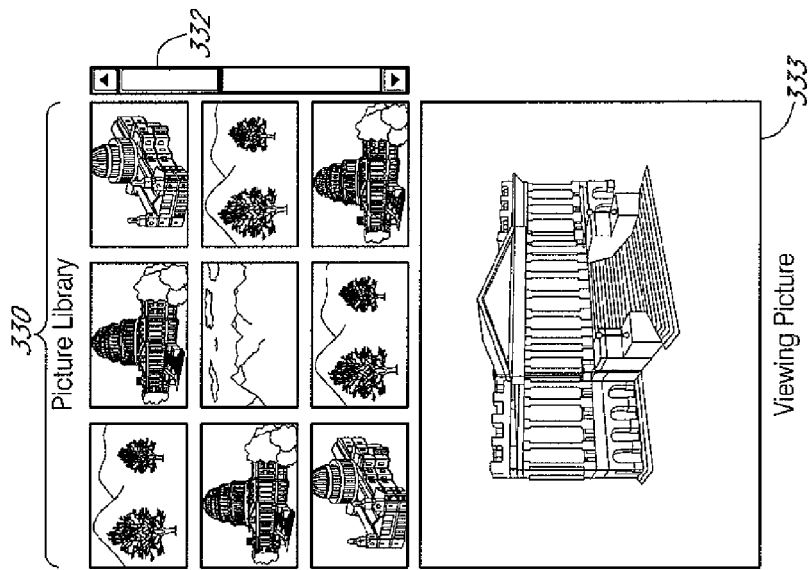
Figure 3C:
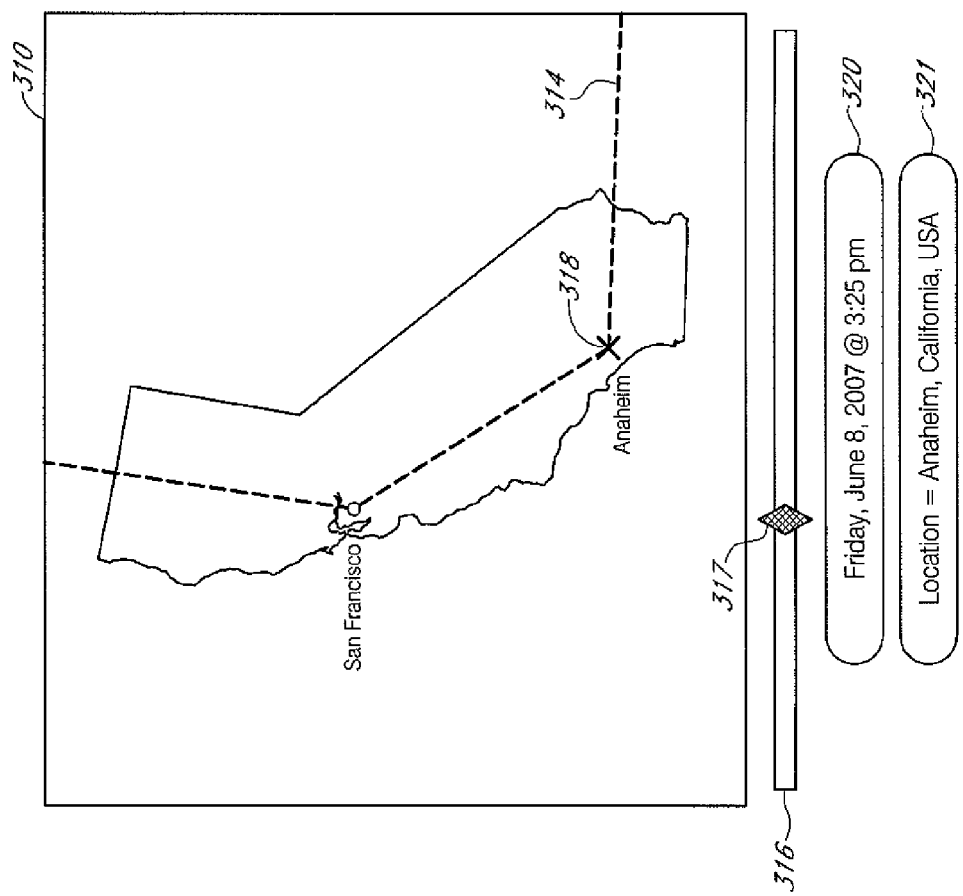

In one embodiment, the user may set the maximum or minimum zoom levels of the map 310. For example, the user may specify that the map may never zoom out farther then a continent level view and may not zoom in nearer then a city wide view. In another embodiment, the minimum and maximum levels of zoom for map 310 may be automatically determined by the system. In FIG. 3C, the slider 317 has been moved farther to the left along sliding bar 316 then in FIG. 3B. This corresponds to another transition in time along the timeline of the trip. In FIG. 3B, the user was in San Francisco, Calif. on Jun. 6, 2007. In FIG. 3C, the time is now Jun. 8, 2007 at 3:25 PM and the user has transitioned to Anaheim, Calif. The map 310 has zoomed in from a view of the North American continent to a view of the state of California. Media preview window 330 has been updated to present media that was captured in Anaheim. Location indicator 318 has been moved to Anaheim on trail 314. A default or user selected image is displayed in media viewing window 333.

Figure 3D:
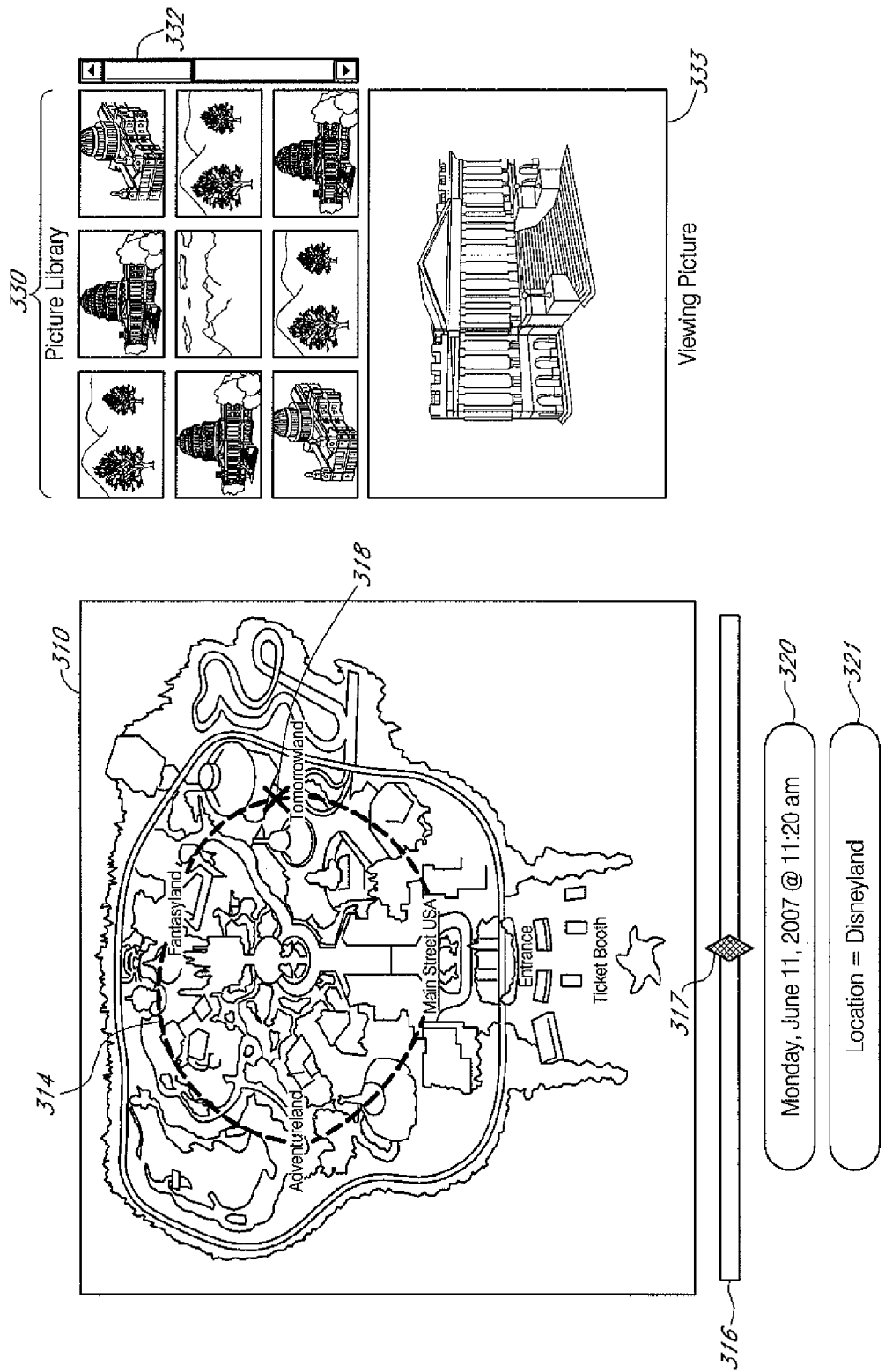

In FIG. 3D, the slider 317 has been moved farther to the left along sliding bar 316 then in FIG. 3C. This corresponds to still another transition in time along the timeline of the trip. In FIG. 3C, the user was in Anaheim, Calif. on Jun. 8, 2007. In FIG. 3D, the time is now Jun. 11, 2007 at 11:20 AM and the user has transitioned to Disneyland in Anaheim, Calif. The map 310 has zoomed in from a view of the state of California to a view of Disneyland in Anaheim. Media preview window 330 has been updated to present media that was captured in Anaheim. Location indicator 318 has been moved to Anaheim on trail 314. A default or user selected image is displayed in media viewing window 333.

Figure 4:
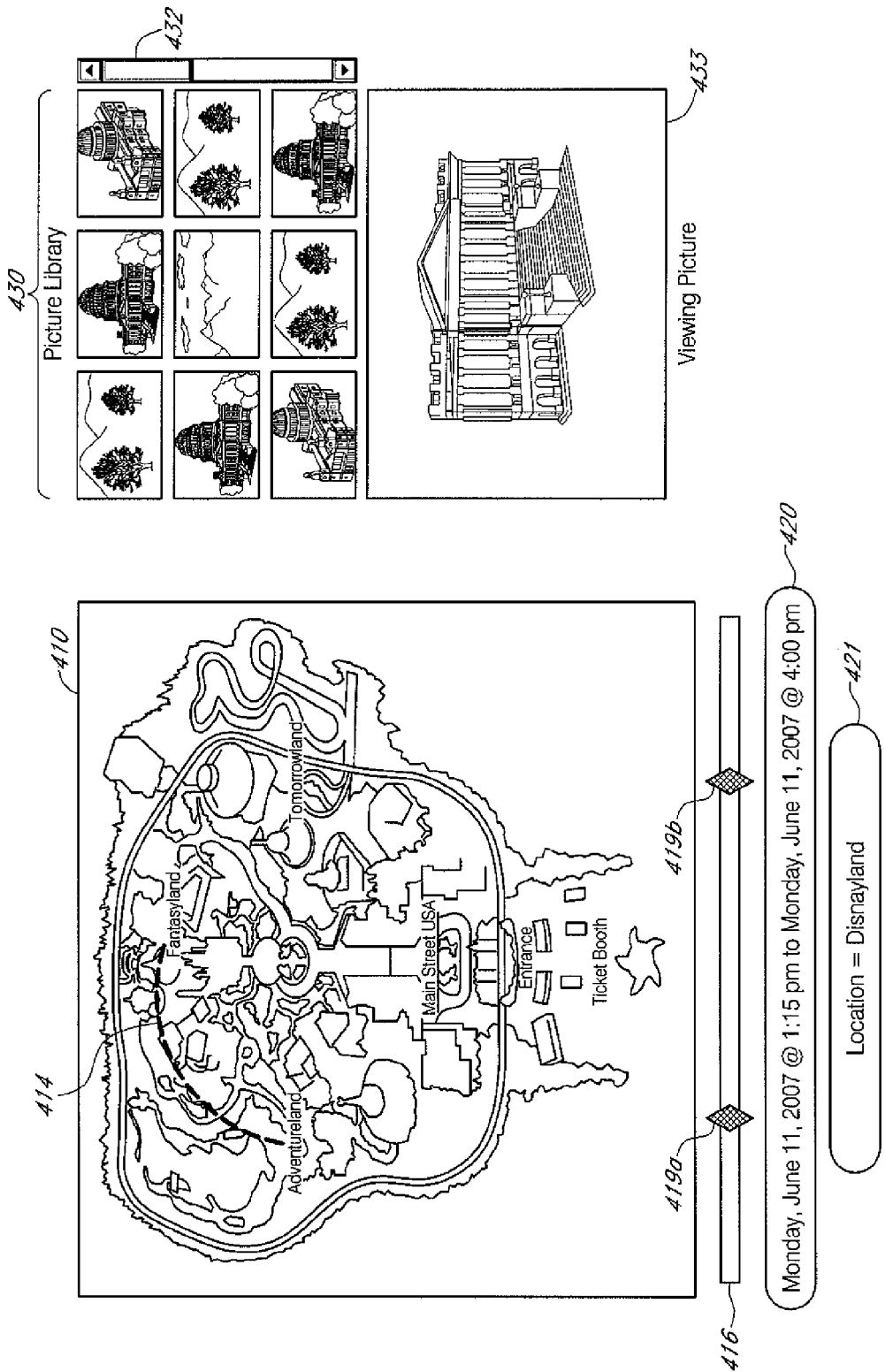
FIG. 4 illustrates a graphical user interface according to a second embodiment.

FIG. 4 illustrates a graphical user interface according to a second embodiment. In FIG. 4, sliding bar 416 has a selected starting point 419a and a selected ending point 419b. A user of the graphical user interface may select any starting or ending point along sliding bar 416. The starting point 419a is generally further on the left or prior to the ending point 419b. The trail 414 displays the location of media that was captured between the specified starting point 419a and the ending point 419b. Preview or thumbnails of the media that was captured between the starting point 419a and the ending point 419b are displayed in preview window 430. The time for the starting point 419a and the time for the ending point 419b are displayed in the time information bar 420. The location of the media captured between starting point 419a and the ending point 419b is displayed in location information bar 421. In alternative embodiments, multiple locations may be displayed in the location information bar 421 if the media capturing between the starting point 419a and the ending point 419b spans multiple locations. For example, if a user selects a start time of Jun. 1, 2007 and an end point of Jun. 5, 2007, and the user travelled from California to Florida in between those times, then the location information bar may display "California, Florida."

Figure 5:
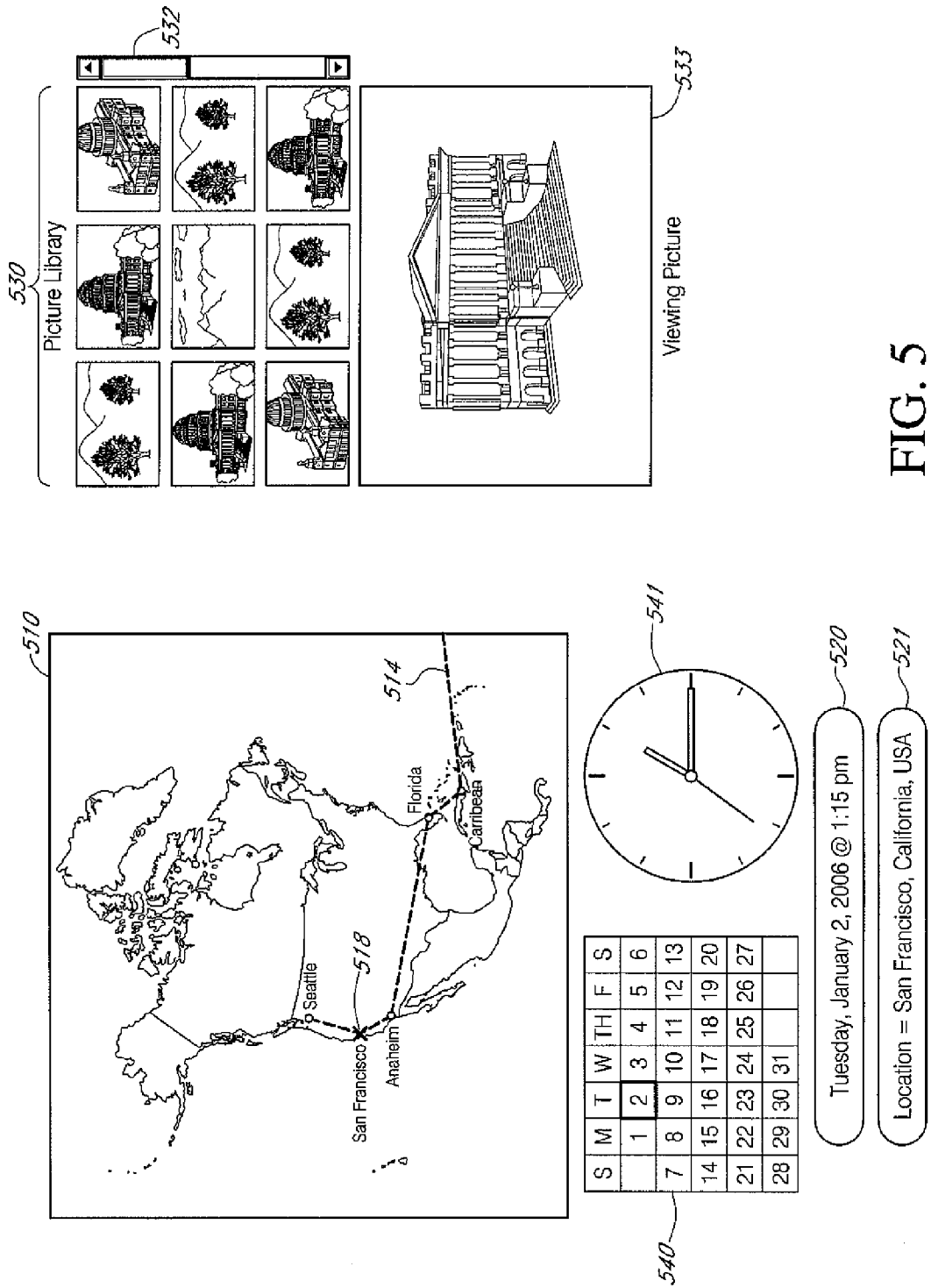
FIG. 5 illustrates a graphical user interface according to a third embodiment.

FIG. 5 illustrates a graphical user interface according to a third embodiment. In FIG. 5, a calendar 540 and a clock 541 indicate a selected times. The time selected by the calendar 540 and the clock 541 is Jun. 2, 2007 at 5:05 PM and is displayed in time information bar 520. The map 510 displays the trail 514 and the location indicator 518 reflects the location where the media was captured at the selected time. Location information bar 521 displays the location where the media was captured. Media preview window 530 has been updated to present media that was captured in selected time and corresponding location. A default or user selected image is displayed in media viewing window 533.

Figure 6:
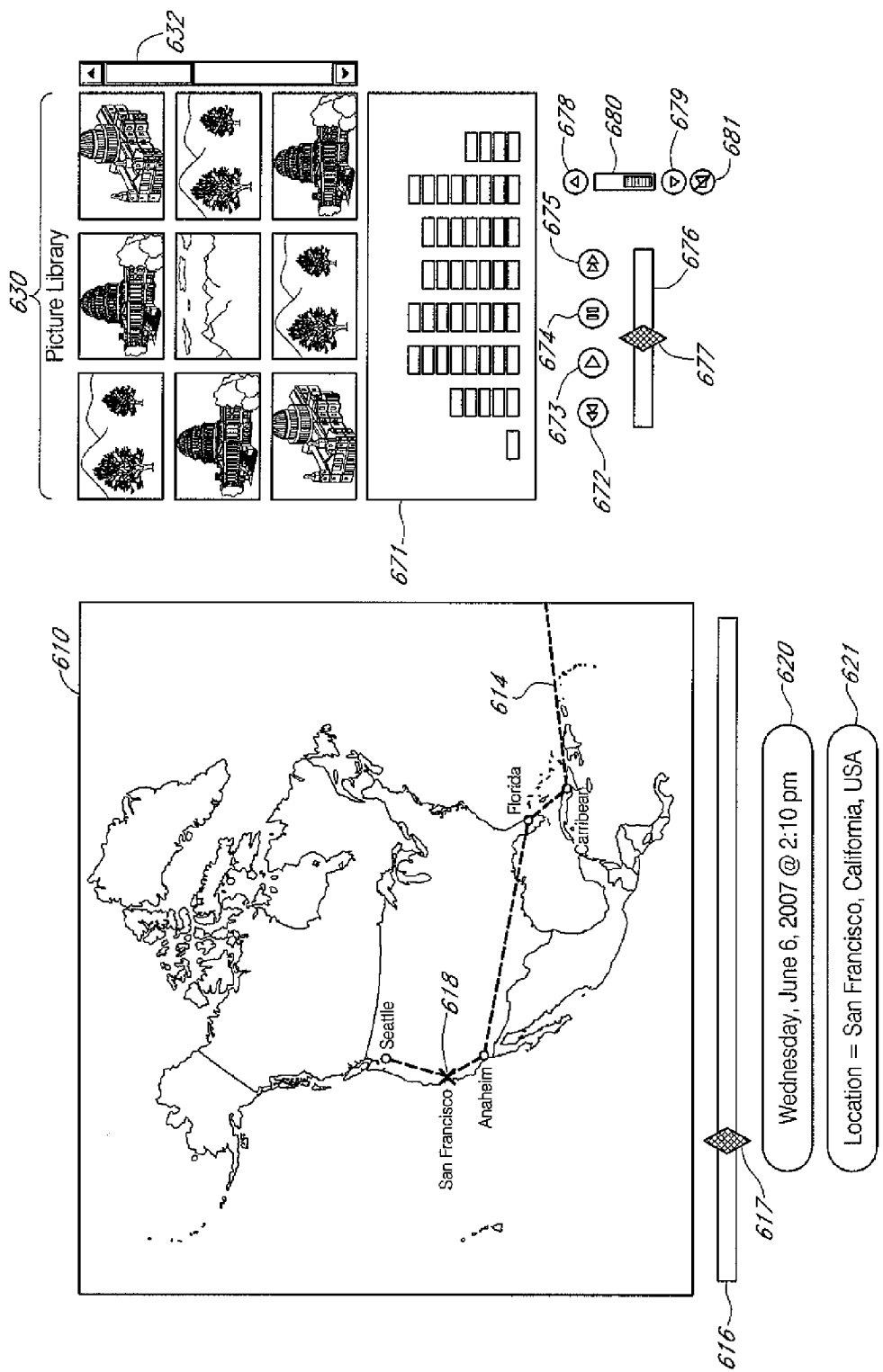
FIG. 6 illustrates a graphical user interface according to a fourth embodiment.

FIG. 6 illustrates a graphical user interface according to a fourth embodiment. Slider 617 indicates a selected time on sliding bar 616 which indicates the timeline. The map 610 displays the trail 614 for the timeline and the location indicator 618 reflects the location where the media was captured at the selected time. Location information bar 621 displays the location where the media was captured. Media preview window 630 has been updated to present media that was captured in selected time and corresponding location. In this embodiment, the media selected for viewing or presentation is an audio media. Audio media may comprise audio files in a variety of formats or it may comprise a sound recording captured by a media capture device such as a digital camera or an audio recorder. The selected audio file is presented or played using buttons 672-681. Equalizer 671 is a graphical representation of the audio media. It may represent the frequencies and amplitudes of sound in the audio media. In alternative embodiments, other graphical representations such as wave forms, or fractal images may be used. Button 672 will rewind the audio media. Button 673 will play the audio media. Button 674 will pause playback of the audio media. Button 675 will fast forward the audio media. Time bar 676 indicates the total length of time of the audio media. Time indicator 677 indicates the current position of playback of the audio media. The user may slide time indicator 677 to move to different positions within the audio media. Button 678 increases the volume of the playback of the audio media. Button 679 decreases the volume of the playback of the audio media. Volume bar 680 indicates the current volume of the playback of the audio media. In another embodiment, a separate application may be executed to present or play the selected audio media. For example, Winamp may be executed to play a selected audio recording which was captured by a digital camera.

Figure 7:
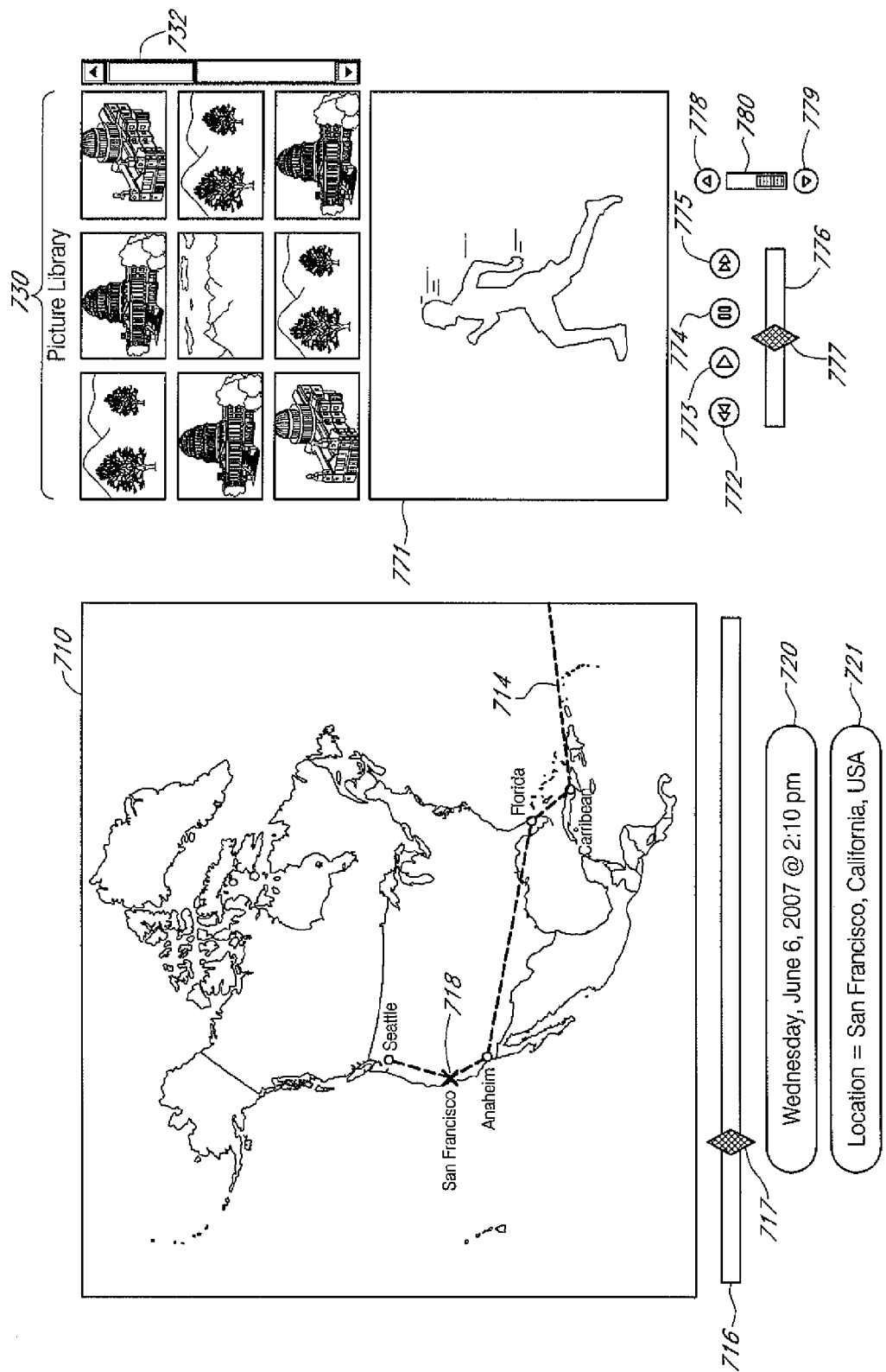
FIG. 7 illustrates a graphical user interface according to a fifth embodiment.

FIG. 7 illustrates a graphical user interface according to a fifth embodiment. Slider 717 indicates a selected time on sliding bar 716 which indicates the timeline. The map 710 displays the trail 714 for the timeline and the location indicator 718 reflects the location where the media was captured at the selected time. Location information bar 721 displays the location where the media was captured. Media preview window 730 has been updated to present media that was' captured in the selected time and corresponding location. In this embodiment, the media selected for viewing or presentation is a video media. Video media may comprise video files in a variety of formats or it may comprise a video recording captured by a media capture device such as a digital camera or a video camera. The selected video file is presented or played using controls 7721-780. The video viewer media may be viewed in video screen 771. Button 772 will rewind the video media. Button 773 will play the video media. Button 774 will pause playback of the video media. Button 775 will fast forward the video media. Time bar 776 indicates the total length of time of the video media. Time indicator 777 indicates the current position of playback of the video media. The user may slide time indicator 777 to move to different positions within the video media. Button 778 increases the volume of the playback of the video media. Button 779 decreases the volume of the playback of the video media. Volume bar 780 indicates the current volume of the playback of the video media. In another embodiment, a separate application may be executed to present or play the selected video media. For example, Windows Media Player may be executed to play a selected video recording which was captured by a digital camera.

Figure 8A:
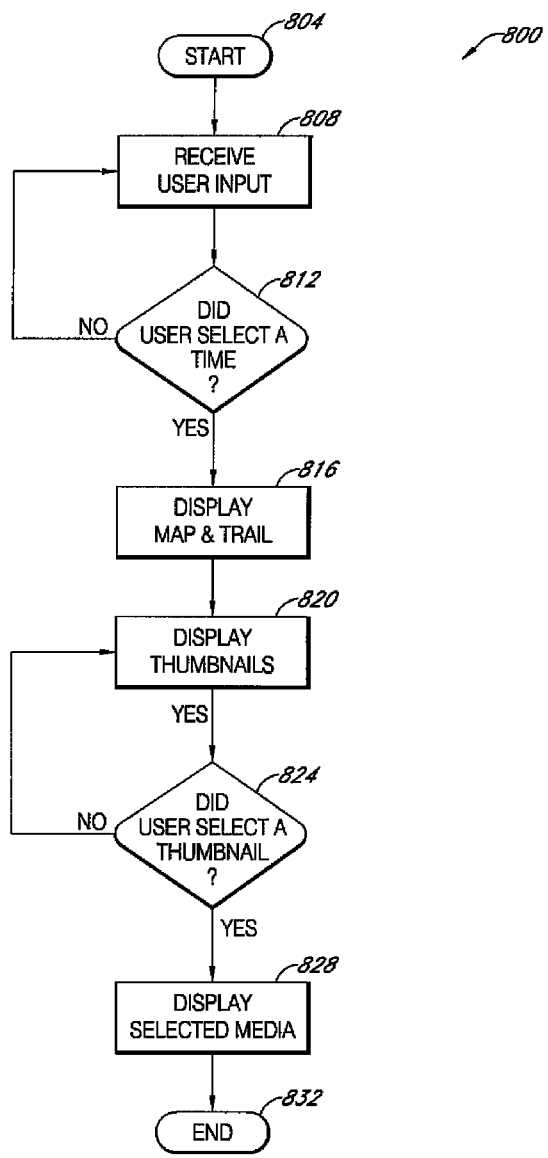
FIG. 8A is a flow diagram of an embodiment of a process for accessing.

FIG. 8A is a flow diagram of an embodiment of a process for accessing media 800. In this example, a user is using a system, like the systems shown in FIGS. 1A-1B, to access media. The user has previously captured media using a media capture device that is "location aware." The captured media is associated with time and location information that was provided by the media capture device.

The process begins at start block 804 and moves to block 808. At block 808, the system receives user input. The user input may comprise a selection of time, a selection of media for viewing or a selection of a point of interest on the map. Next, at block 812, the user input is analyzed to determine if the user has selected a time. If the user has not selected a time, the process moves back to block 808 and waits for user input. Referring to FIG. 3A, when a user moves slider 317, this user input is accepted and processed at block 808 and 812. The process then moves to block 816 where a map and a trail are displayed. The map and the trail that are displayed correspond to the time selected by the user as shown and described in FIG. 3A. The trail displayed on the map indicates the locations where media was captured during a timeline displayed by the system. A current location may be displayed on the map and the current location may correspond to the selected time. The process then moves to block 820 where previews or thumbnails of the media are displayed as shown in preview window 330 in FIG. 3A. The system receives user input at block 824. If the user selects a thumbnail for viewing or presenting, the process then moves to block 828 and displays or presents the selected media as shown in media viewing window 333 in FIG. 3A. If the user has not selected a media, the process moves back to block 674. After displaying or presenting the media, the process moves to end block 832. In alternative embodiments, a default media may be displayed and the user may not need to select a particular media.

Figure 8B:
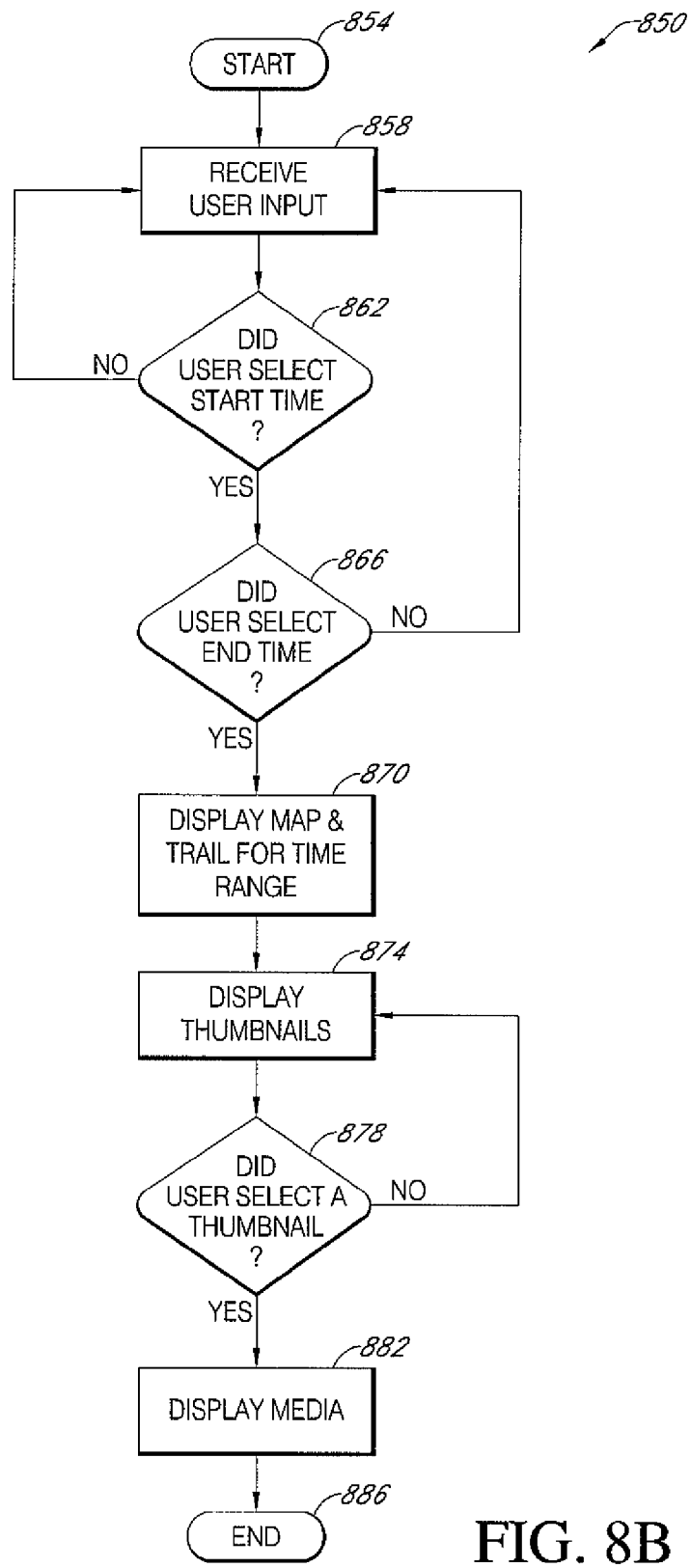
FIG. 8B is a flow diagram of another embodiment of a process for accessing.

FIG. 8B shows flow diagram 850 of another embodiment of a process for accessing media. In this example, a user is attempting to access media he has previously stored. The user may be using a system as shown in FIG. 1B or the user may be using a personal computer. The user has previously captured media using a media capture device that is location aware. The captured media is associated with location information that was provided by the media capture device.

The process begins at start block 854 and moves to block 858. At block 858, the system receives user input. The user input may comprise a selection of time, a selection of media for viewing or a selection of a point of interest on the map. Next, at block 862, the user input is analyzed to determine if the user has selected a start time. If the user has not selected a start time, the process moves back to block 858 and waits for user input. If the user has selected a start time, the process then moves to block 866. If the user has not selected an end time, the process moves back to block 658. If the user has selected an end time, the process moves to block 870. Referring to FIG. 4, when a selects a start time 419a and an end time 419b, that input is received at block 858 processed at block 862 and 866. At block 870, a map and a trail are displayed. The map and the trail that are displayed correspond to the time selected by the user as shown and described in FIG. 4. The trail displayed on the map indicates the locations where media was captured during range of times selected by the user. The process then moves to block 874 where previews or thumbnails of the media are displayed as shown in preview window 430 in FIG. 4. The system receives user input at block 878. If the user selects a thumbnail for viewing or presenting, the process then moves to block 882 and displays or presents the selected media as shown in media viewing window 433 in FIG. 4. After displaying or presenting the media, the process moves to end block 886. In alternative embodiments, a default media may be displayed and the user may not need to select a particular media.

In one embodiment, the graphical user interface may display a "slide show" of all the media associated with a trip. For example, the user may start the slide show and the slider may progress along the sliding bar. As the slider moves at a predetermined rate, the map, trail, and location indicator may be updated. The preview window may be updated to display media corresponding to the time specified by the slider. The media viewing window may be updated with different pictures as the slider progresses along the sliding bar. The images displayed in window may be updated in a sequential order according to the time information of the media and may correspond with the images displayed in the preview window. The starting time and ending time for the slide show may be selected by the user via the input device shown in FIGS. 1A-1B. For example, a user may specify that his trip started on Jun. 2, 2007 at 4:15 PM and ended at Jun. 5, 2007 when he returned.

In another embodiment, the user may manually select media and associate the selected media with a trip. For example, a user's media have been captured over a long range of time such as the last five years. However, during the last five years, the user may have taken five separate trips. Rather then display all of the trips on one map and using one sliding bar to indicate the five years, the user may associate his media with one of the five trips. When viewing or his media, the user may select a trip and the graphical user interface would be updated with the correct map, selection of times on the sliding bar, and the media associated with that trip. In this embodiment, the user may be able to create a slide show using the manually selected media for the trip.

In another embodiment, the user may be able to transfer a "packaged slide show" to another user. For example, the user may select a start time and an end time for the slide show. The system may gather all of the media that was captured between the start time and the end time. It may then combine the media into a "package" and transmit that package to a second user. The second user may view the package of media using the systems and methods described herein. This allows a user to easily share and present his media to other uses in a natural, story-based format which correlates the media that was captured, with a particular time and place that the media was captured.

The above-described method may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or fluctions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method comprising:
    displaying a slider bar comprising a slider element, the slider bar corresponding to a timeline including a plurality of points in time;
    displaying, with the slider bar, a map of a geographical area having a plurality of geographical locations, wherein each of the plurality of points in time corresponds to at least one of the plurality of geographical locations;
    receiving, via an input device, a user-selected point in time from the plurality of points in time of the slider bar using the slider element;
    displaying a library corresponding to a first geographical location of the plurality of geographical locations in the geographical area, wherein the first geographical location is determined in response to the receiving of the user-selected point in time and based on the user selected point in time;
    receiving, via the input device, a selection of a media from the library by the user; and
    presenting the media on the display.

2. The method of claim 1, wherein the timeline is selected by the user through at least one of selecting a date on a calendar, setting a time on a clock, and inputting a time via the input device.

3. The method of claim 1, further comprising displaying a trail on the map connecting a starting location and an ending location selected by the user.

4. The method of claim 1, wherein the media presented comprises a video.

5. The method of claim 1, wherein the media presented comprises a picture.

6. The method of claim 1, wherein the media presented comprises an audio recording.

7. The method of claim 1, wherein the size of the geographical area represented is based, at least in part, on the user selected point in time selected by the user.

8. A system comprising:
a display;
an input device; and
a processor configured to:
  display, on the display, a slider bar comprising a slider element, the slider bar corresponding to a timeline including a plurality of points in time;
  display, with the slider bar, a map of a geographical area having a plurality of geographical locations, wherein each of the plurality of points in time corresponds to at least one of the plurality of geographical locations;
  receive, using the input device, a user selected point in time from the plurality of points in time of the slider bar using the slider element;
  display, on the display, a library corresponding to a first geographical location of the plurality of geographical locations in the geographical area, wherein the first geographical location is determined in response to receiving the user selected point in time and based on the user selected point in time;
  receive, via the input device, a selection of a media from the library by the user; and
  present the media on the display.

9. The system of claim 8, wherein the timeline is selected using at least one of a calendar, clock face, and a time selection tool.

10. The system of claim 8, wherein the processor is further configured to display, on the display, a trail on the map connecting a starting location and an ending location selected by the user.

11. The system of claim 8, wherein the media presented comprises a video.

12. The system of claim 8, wherein the media presented comprises a picture.

13. The system of claim 8, wherein the media presented comprises an audio recording.

14. The system of claim 8, wherein the size of the geographical area represented is based, at least in part, on the user selected point in time selected by the user.

* * * * *